United States Patent
Farnsworth

(10) Patent No.: US 8,447,336 B2
(45) Date of Patent: *May 21, 2013

(54) METHOD AND APPARATUS FOR REDUCING LINK INTERFERENCE BY A LINK BETWEEN A USER EQUIPMENT COMPONENT AND AN ACCESS NETWORK COMPONENT

(75) Inventor: Andrew Farnsworth, Marlbrook (GB)

(73) Assignee: Research In Motion Limited, Waterloo (CA)

(*) Notice: Subject to any disclaimer, the term of this patent is extended or adjusted under 35 U.S.C. 154(b) by 395 days.

This patent is subject to a terminal disclaimer.

(21) Appl. No.: 12/706,437

(22) Filed: Feb. 16, 2010

(65) Prior Publication Data

US 2010/0159839 A1 Jun. 24, 2010

Related U.S. Application Data

(63) Continuation of application No. 11/457,544, filed on Jul. 14, 2006, now Pat. No. 7,693,104.

(51) Int. Cl.
*H04B 15/00* (2006.01)

(52) U.S. Cl.
USPC .......... 455/501; 455/436; 455/418; 370/331

(58) Field of Classification Search
USPC .......... 455/501, 436, 418; 370/331
See application file for complete search history.

(56) References Cited

U.S. PATENT DOCUMENTS

| | | | |
|---|---|---|---|
| 7,184,448 B2 | 2/2007 | Moon et al. | |
| 2003/0193915 A1* | 10/2003 | Lee et al. | 370/335 |
| 2004/0110512 A1* | 6/2004 | Lim | 455/450 |
| 2006/0068703 A1* | 3/2006 | Ng et al. | 455/41.2 |
| 2006/0098599 A1* | 5/2006 | Choi et al. | 370/331 |
| 2006/0199578 A1* | 9/2006 | Tamura et al. | 455/422.1 |
| 2006/0264207 A1* | 11/2006 | Tamura et al. | 455/415 |

* cited by examiner

*Primary Examiner* — Danh Le
(74) *Attorney, Agent, or Firm* — Novak Druce Connolly Bove + Quigg LLP

(57) ABSTRACT

A method and apparatus are described for reducing link interference by a link between a user equipment component and an access network component. The user equipment component and access network component are connected by links over dedicated channels in respective directions, the link channel power in the first direction being controlled by the link channel in the second direction. A component sends in a second direction a link connection release message for a link connection in the first direction, identifies when the link connection in the first direction is released and, when the release is identified, releases the link connection in the second direction.

12 Claims, 10 Drawing Sheets

METHOD AND APPARATUS FOR REDUCING LINK INTERFERENCE BY A LINK BETWEEN A USER EQUIPMENT COMPONENT AND AN ACCESS NETWORK COMPONENT

CROSS-REFERENCE TO RELATED APPLICATIONS

The instant application is a continuation of U.S. patent application Ser. No. 11/457,544, filed Jul. 14, 2006, entitled "Method and Apparatus for Reducing Link Interference by a Link Between a User Equipment Component and an Access Network Component," the contents of which are incorporated herein.

BACKGROUND

A portion of the disclosure of this patent document contains material which is subject to copyright protection. The copyright owner has no objections to the facsimile reproduction by any one of the patent document or patent disclosures, as it appears in the Patent and Trademark Office patent file or records, but otherwise reserves all copyrights whatsoever.

TECHNICAL FIELD

This application relates to telecommunication systems in general, having for example application in UMTS (Universal Mobile Telecommunications System) and in particular relates to a method and apparatus for reducing link interference by a link between a user equipment component and an access network component.

DESCRIPTION OF THE RELATED ART

The approaches described in this section could be pursued, but are not necessarily approaches that have been previously conceived or pursued. Therefore, unless otherwise indicated herein, the approaches described in this section are not prior art to the claims in this application and are not admitted to be prior art by inclusion in this section.

In a typical cellular radio system, mobile user equipment (UE) communicates via a radio access radio network (RAN) to one or more core networks. User equipment (UE) comprises various types of equipment such as mobile telephones (also known as cellular or cell phones), lap tops with wireless communication capability, personal digital assistants (PDAs) etc. These may be portable, hand held, pocket sized, installed in a vehicle etc and communicate voice and/or data signals with the radio access network.

In the following, reference will be made to UMTS and to particular standards. However it should be understood that the invention is not intended to be limited to any particular mobile telecommunications system or standard.

The radio access network covers a geographical area divided into a plurality of cell areas. Each cell area is served by at least one base station, which in UMTS may be referred to as a Node B. Each cell is identified by a unique identifier which is broadcast in the cell. The base stations communicate at radio frequencies over an air interface with the UEs within range of the base station. Several base stations may be connected to a radio network controller (RNC) which controls various activities of the base stations. The radio network controllers are typically connected to a core network.

UMTS is a third generation public land mobile telecommunication system. Various standardization bodies are known to publish and set standards for UMTS, each in their respective areas of competence. For instance, the 3GPP (Third Generation Partnership Project) has been known to publish and set standards for GSM (Global System for Mobile Communications) based UMTS, and the 3GPP2 (Third Generation Partnership Project 2) has been known to publish and set standards for CDMA (Code Division Multiple Access) based UMTS. Within the scope of a particular standardization body, specific partners publish and set standards in their respective areas.

Consider a wireless mobile device, generally referred to as user equipment (UE), that complies with the 3GPP specifications for the UMTS protocol. The 3GPP 25.331 specification, v.3.15.0, referred to herein as the 25.331 specification, addresses the subject of UMTS RRC (Radio Resource Control) protocol requirements between the UMTS Terrestrial Radio Access Network (UTRAN) and the UE.

In accordance with section 8.1.4 of the 2.5.331 V5.15.0 specification, when a RAN component for example a UMTS Terrestrial Radio Access Network (UTRAN) access point which is to release a connection with a user equipment, for example at the end of a call, the UTRAN sends a RRC CONNECTION RELEASE message to the user equipment. The manner in which the release procedure is handled depends on the connection state which can be a dedicated channel CELL_DCH state or a forward access channel CELL_FACH state.

In the dedicated CELL_DCH state, release takes place as shown in FIG. 1 which is a diagram showing the message exchange procedure, FIG. 2 which is the flow diagram as shown in steps performed at the UTRAN and FIG. 3 which is a flow diagram showing the steps performed at the UE.

Referring to FIGS. 1 and 2, the steps performed by the UTRAN comprise at step 200 and time $t_1$, the UTRAN sending the "RRC CONNECTION RELEASE" (termed here "RELEASE") message 100 on a dedicated physical or common control channel (DPCH/CCCH). Values N308, T308 as specified in the 25.331 specification govern the number of response messages ("RRC CONNECTION RELEASE COMPLETE" termed here "COMPLETE) that should be sent by the UE, N308 and the period that should elapse between each COMPLETE message, T308, as discussed in more detail below. It will be noted that the UTRAN may send multiple RELEASE messages to ensure that at least one is received by the UE.

At step 202 the UTRAN receives the first of the N308 COMPLETE messages 102, at a time $t_3$. When the first COMPLETE message is received, at step 204 the UTRAN releases all UE dedicated resources for the relevant downlink to the UE.

The corresponding steps performed at the UE can be further understood with reference to FIG. 3 in conjunction with FIG. 1. At step 300 the UE receives the RELEASE message 100 at a time $t_2$ and sets a counter V308=0. At stop 302 the UE sends the first COMPLETE message 102 and at step 304 starts the timer T308.

At step 304 on expiry of T308, V308 is incremented and, if V308≦N308 at step 306, the UE resends the COMPLETE message (step 302) N308 times (such that N308+1 messages are in fact sent), the second COMPLETE message 104 being sent at time $t_4$ and the $(N308+1)^{th}$ COMPLETE message 106 being sent at time $t_5$. The COMPLETE message is resent multiple times because the procedure is in unacknowledge mode (UM), the number of times it is sent being selected to increase the likelihood of at least one COMPLETE message being received by the UTRAN whilst avoiding excessive retransmission.

At step 308, at time $t_5$, when the final COMPLETE message 106 is sent, the UE goes into idle mode after a final period T308 releasing the uplink dedicated channels to the UTRAN.

It has been found that during the CELL_DCH RELEASE procedure a spike in uplink power from the UE can occur in certain situations which can give rise to uplink interference in other UEs until the uplink switches off.

There are thus proposed strategies for a method and apparatus for reducing link interference by a link between a user equipment component and an access network component. A number of such strategies are detailed below.

Other aspects and features of the proposed strategy will become apparent to those ordinarily skilled in the art upon review of the following description of specific embodiments of a method and apparatus for reducing link interference by a link between a user equipment component and an access network component.

BRIEF DESCRIPTION OF THE DRAWINGS

Embodiments will now be described, by way of example only, with reference to the attached drawings, in which.

The same reference numerals are used in different figures to denote similar elements.

DETAILED DESCRIPTION OF THE DRAWINGS

A method and apparatus for reducing link interference by a link between a user equipment component and an access network component are described. In the following description, for the purposes of explanation, numerous specific details are set forth in order to provide a thorough understanding of the present invention. It will be apparent, however, to one skilled in the art that the technique may be practised without these specific details. In other instances, well-known structures and devices are shown in block diagram form in order to avoid unnecessarily obscuring the present invention.

The needs identified in the foregoing Background, and other needs and objects that will become apparent from the following description, are achieved by, in one aspect, a method and apparatus for reducing link interference by a link between a user equipment component and an access network component. In other aspects, the invention encompasses a computer-readable medium configured to carry out the foregoing steps. In particular, the method may be implemented in a mobile telecommunications device, with or without voice capabilities, or other electronic devices such as handheld or portable devices, or in a RAN component as appropriate.

Figure 4A:
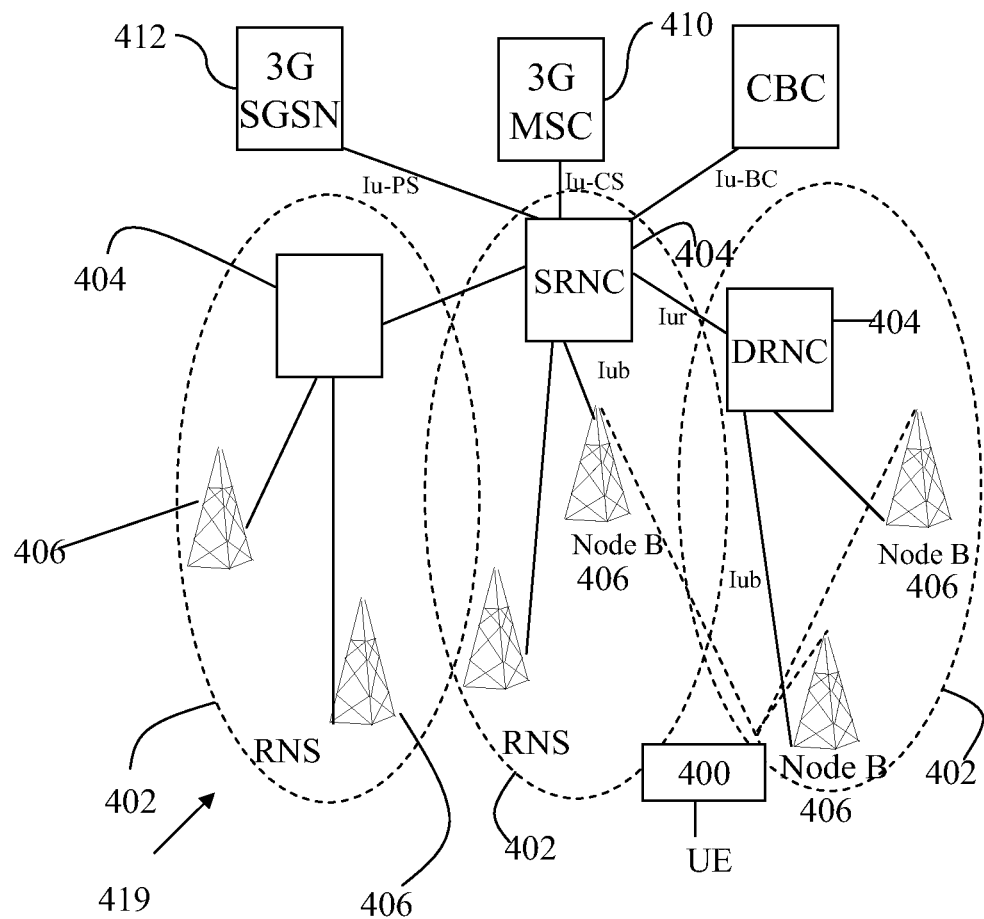
FIG. 4a is a schematic diagram showing an overview of a network and a UE device.

Referring to the drawings, FIG. 4a shows an overview of a network and a UE device. Clearly in practice there may be many UE devices operating with the network but, for the sake of simplicity, FIG. 4a only shows a single UE device 400. For the purposes of illustration, FIG. 4a also shows a network 419 having a few components. It will be clear to a person skilled in the art that in practice a network will include far more components than those shown.

FIG. 4a shows an overview of the radio access network 419 (UTRAN) used in a UMTS system. The network 419 as shown in FIG. 4a comprises three Radio Network Subsystems (RNS) 402. Each RNS has a Radio Network Controller (RNC) 404. Each RNS 402 has one or more Node B 406 which are similar in function to a Base Transmitter Station of a GSM radio access network. User Equipment UE 400 may be mobile within the radio access network. Radio connections (indicated by the straight dotted lines in FIG. 4a) are established between the UE and one or more of the Node Bs in the UTRAN.

The radio network controller controls the use and reliability of the radio resources within the RNS 402. Each RNC may also connected to a 3G mobile switching centre 410 (3G MSC) and a 3G serving GPRS support node 412 (3G SGSN).

An RNC 404 controls one or more Node B's. An RNC plus its Node B's together make up an RNS 402. A Node B controls one or more cells. Each cell is uniquely identified by a frequency and a primary scrambling code (primary CPICH in FDD, primary CCPCH in TDD).

Generally in UMTS a cell refers to a radio network object that can be uniquely identified by a UE from a cell identifier that is broadcast over geographical areas from a UTRAN access point. A UTRAN access point is a conceptual point within the UTRAN performing radio transmission and reception. A UTRAN access point is associated with one specific cell i.e., there exists one UTRAN access point for each cell. It is the UTRAN-side end point of a radio link. A single physical Node B 406 may operate as more than one cell since it may operate at multiple frequencies and/or with multiple scrambling codes.

Figure 4B:
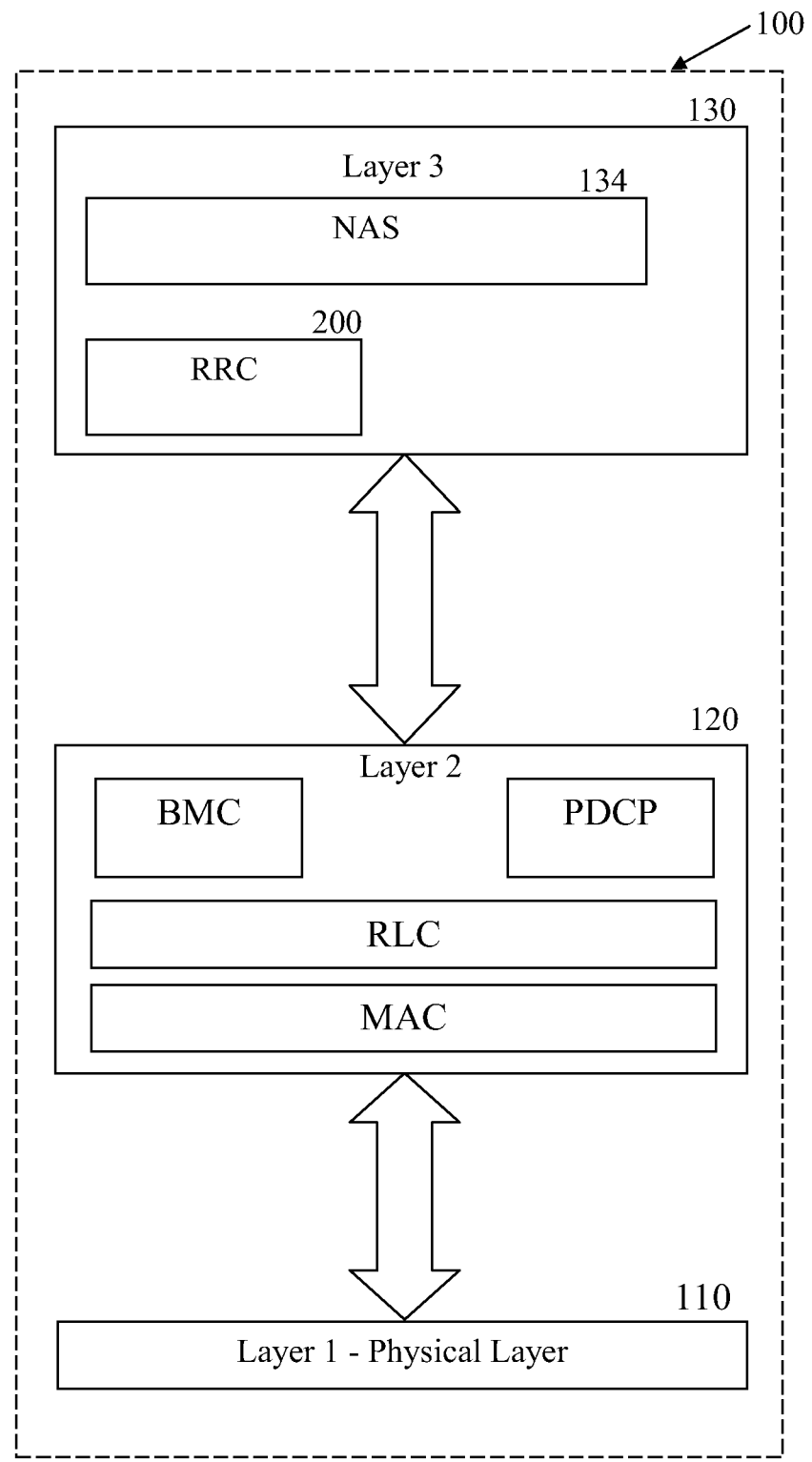
FIG. 4b is a block diagram illustrating an embodiment of a protocol stack provided in a UE.

FIG. 4b is a block diagram illustrating an embodiment of a protocol stack provided in a UE. A Radio Resource Controller (RRC) block 400 is a sub layer of Layer 3 422 of a UMTS protocol stack 424. The RRC 424 exists in the control plane only and provides an information transfer service to the non-access stratum NAS 426. The RRC 420 is responsible for controlling the configuration of radio interface Layer 1 428 and Layer 2 430. When the UTRAN wishes to change the UE configuration it will issue a message to the UE containing a command to invoke a specific RRC procedure. The RRC 420 layer of the UE decodes this message and initiates the appropriate RRC procedure. Generally when the procedure has been completed (either successfully or not) then the RRC sends a response message to the UTRAN (via the lower layers) informing the UTRAN of the outcome. It should be noted that there are a few scenarios where the RRC will not issue a response message to the UTRAN and, in those cases the RRC need not and does not reply.

The RRC block 420 can implement several different behaviour strategies for the method and apparatus described herein. These are summarised below, and then explained in detail subsequently, with reference to the drawings.

In overview the method and apparatus as described herein recognise that the UL interference arises from the manner in which power is controlled in a state such as CELL_DCH and hence identify how to reduce that link interference. The method and apparatus are applied in connection states such as CELL_DCH where a radio or other link between a user equipment component such as a UE and an access network component such as a UTRAN is provided over a dedicated link channel (e.g. DPCH) in the respective directions, where the link channel power in a first direction, for example the uplink power, is controlled by the link channel in the second direction, for example the downlink.

In particular, the downlink messages include data and additional fields including a transmit power command (TPC) which takes the form "power up" or "power down", instructing the UE to increase or decrease the uplink power appropriately. During the RELEASE procedure, when the UTRAN releases an RRC CONNECTION from CELL_DCH, the downlink channel is switched off. If the UE is still transmitting on the uplink channel it will then read noise where the downlink TPC commands were previously. As the UE is reading noise, it may interpret this as a "power up" command. As a result a spike in uplink power can occur, causing uplink interference.

Figure 1:
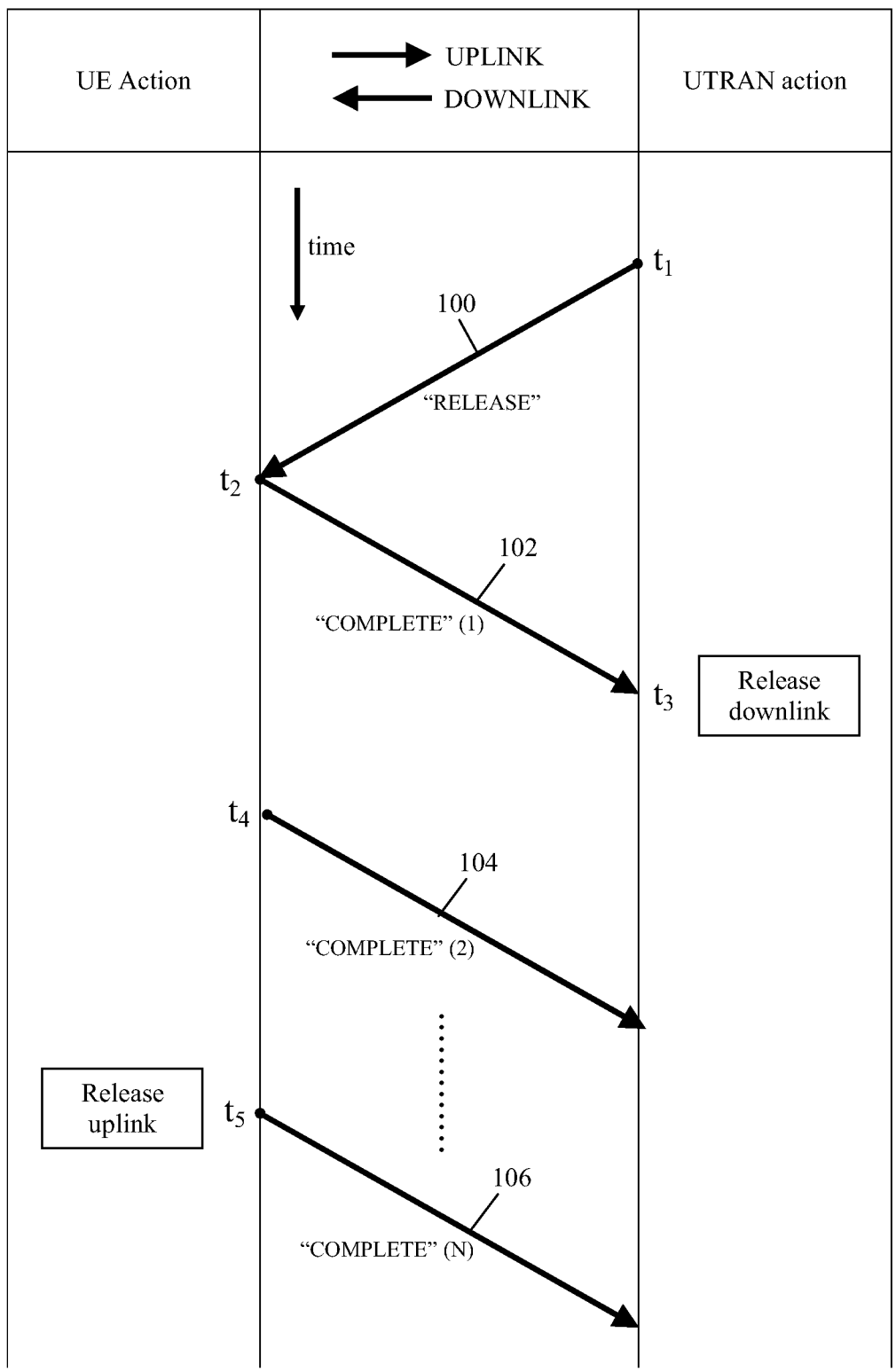
FIG. 1 shows a release procedure between a UTRAN and a UE in CELL_DCH.
Figure 2:
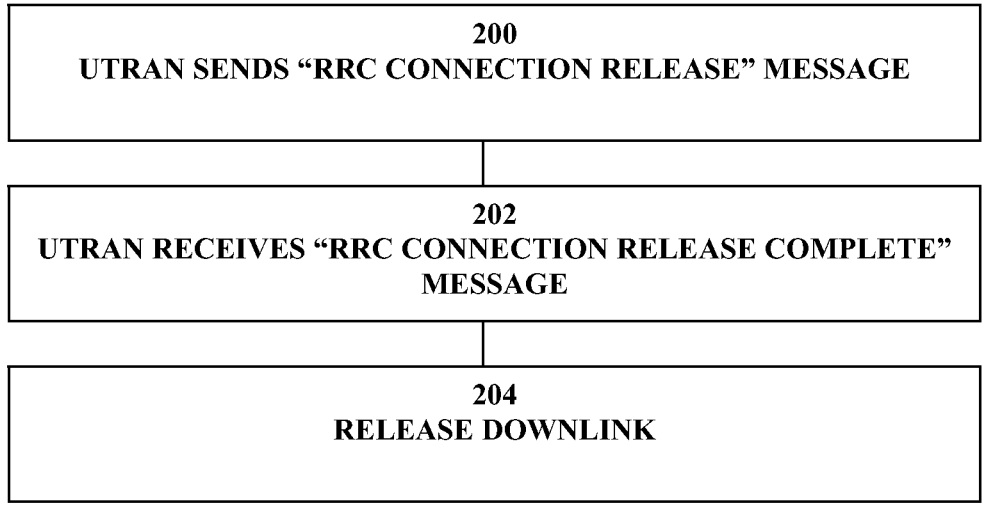
FIG. 2 is a flow diagram showing the steps performed by the UTRAN during the release procedure.
Figure 3:
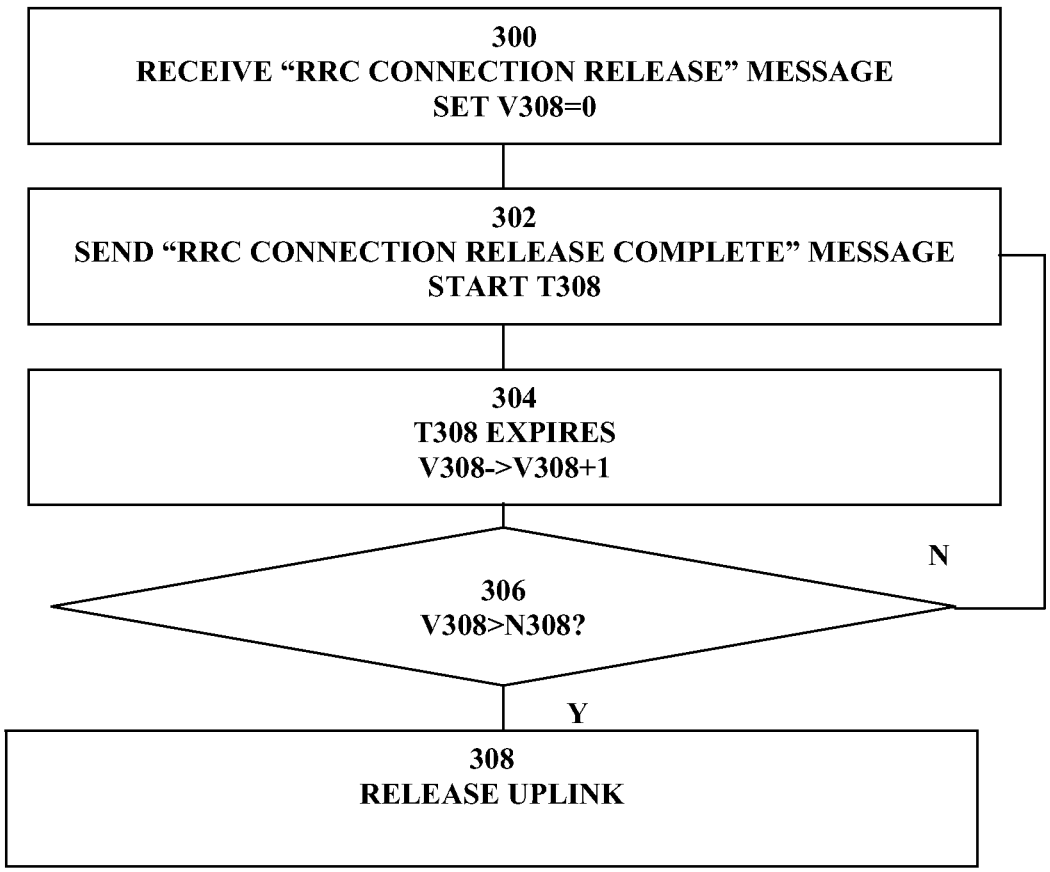
FIG. 3 is a flow diagram showing steps performed by the UE during the release procedure.

This can be further understood with reference to FIG. 1, as discussed above. As can be seen, the downlink is released by the UTRAN at a time $t_3$, but the uplink is only released by the UE at a later time $t_5$, when the final COMPLETE message has been sent. During this time, therefore, the UE can read noise where the downlink commands were previously, giving rise to the power spike and interference problem identified above. The period for which this occurs depends on various factors including the value of T308 and N308 as well as the transmission time interval (TTI) but can be of the order of 0.5 seconds.

Figure 5:
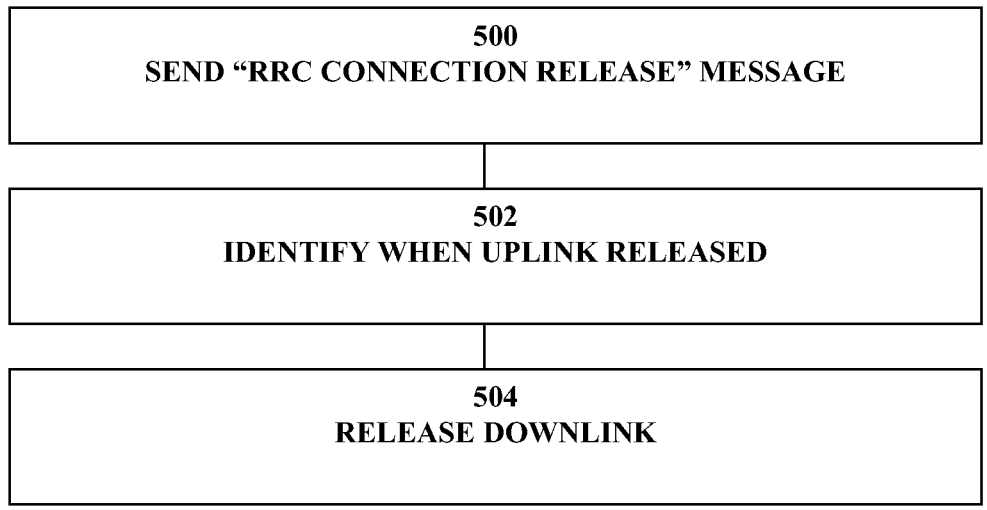
FIG. 5 is a flow diagram showing, at a high level, steps performed by a UTRAN during a release procedure according to a first aspect of the method and apparatus described herein.

Having first recognised the cause of the problem, the method and apparatus described herein further provide various possible solutions as described below. A first aspect is described in overview with reference to FIG. 5 which is a flow diagram showing the steps performed at a UTRAN. At step 500 the relevant component, in this specific embodiment the UTRAN, sends in the direction towards the other component, in this specific embodiment the UE, a link connection release message for the link connection in the other direction, for example the RELEASE message described in more detail above. At step 502 the UTRAN identifies when the uplink dedicated channels are released. At step 504 when the uplink is released, the downlink is released immediately or subsequently.

As described in more detail below, various approaches are provided according to this aspect in particular for identifying or detecting when the uplink is released. One method is directly, by measuring the uplink power—when the uplink channel is switched off there will a sharp decrease in received power indicating that the uplink has been released. Alternatively the UTRAN can monitor for receipt of N308+1 COMPLETE messages. Once the UE has sent all of these, it will have switched off its uplink. A third approach comprises waiting a calculated amount of time, based on T308 and N308 after beginning the procedure, when it is known that the uplink channel will have been released. According to a fourth approach the release procedure in CELL_DCH can be changed to allow acknowledgement mode (AM) for the RELEASE and COMPLETE messages which would prevent the need for multiple COMPLETE message such that the UE could switch off its uplink channel sooner. In case of the fourth approach appropriate steps must also be taken at the UE as described in more detail below.

According to the first aspect the downlink is only released after the uplink is released, corresponding to a lengthening of the period ending at $t_3$ or shortening of the period ending at $t_5$ such that $t_3$ matches or exceeds $t_5$ or is sufficiently close that any interference is below an acceptable threshold.

Figure 6:
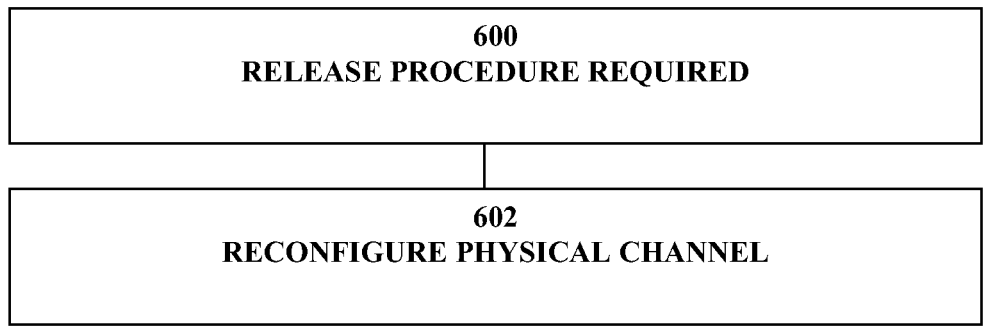
FIG. 6 is a flow diagram showing at a high level the steps performed at a UTRAN during a release procedure according to a second aspect of the method and apparatus described herein.

The method and apparatus in a second aspect can be understood with reference to FIG. 6 which is a flow diagram showing the steps performed at a UTRAN. At step 600 the UTRAN recognises that the release procedure is required. At step 602, the UTRAN sends a reconfigure message, for example a Physical Channel Reconfiguration message to move the UE to another state for example a common link channel state such as CELL_FACH in which the link power in, for example, the uplink direction is independent of the link in, for example, the downlink direction. Furthermore AM can be used according to the current RELEASE procedure in CELL_FACH. Because CELL_FACH relies on common rather than dedicated channels the uplink and downlink powers are independent such that the power spike and interference phenomenon does not occur.

It will be noted that although, in the specific embodiments, the procedure is discussed principally in relation to a release procedure commenced at an access network component such as a UTRAN, it is contemplated that the method and apparatus, with suitable modification, are applicable to a corresponding procedure implemented at a user equipment component such as a UE.

The method and apparatus according to the first aspect will now be described in more detail with regards to FIGS. 7 to 10*a* which comprise flow diagrams showing in more detail the steps performed at the UTRAN according to, respectively, the first to fourth approaches of the first aspect, and FIG. 10*b* which is a flow diagram showing in more detail the steps performed at a UE according to the fourth approach of the first aspect.

Figure 7:
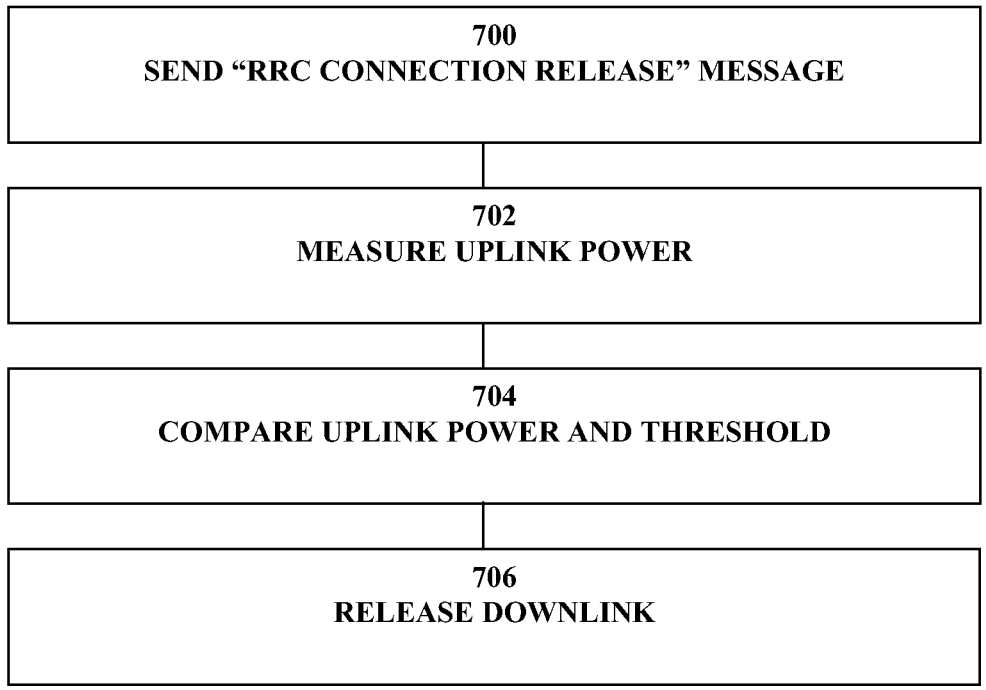
FIG. 7 is a flow diagram showing in more detail the steps performed at a UTRAN according to a first approach of the first aspect.

Referring firstly to FIG. 7, according to the first approach, at step 700 the UTRAN sends a RELEASE message as described before. At step 702 the UTRAN then monitors a parameter representative of the uplink power which can be performed in any appropriate manner as will be apparent to the skilled reader. At step 704, the UTRAN identifies if the uplink power or the corresponding monitored parameter, approaches or drops below (or, if appropriate, rises above) a threshold value which can be a fixed or variable value or a ratio comprisable, for example, in dB, and if so, at step 706, the UTRAN releases the downlink. As the downlink is released after the uplink is identified to have been released, no uplink spike or excessive interference will occur.

Figure 8:
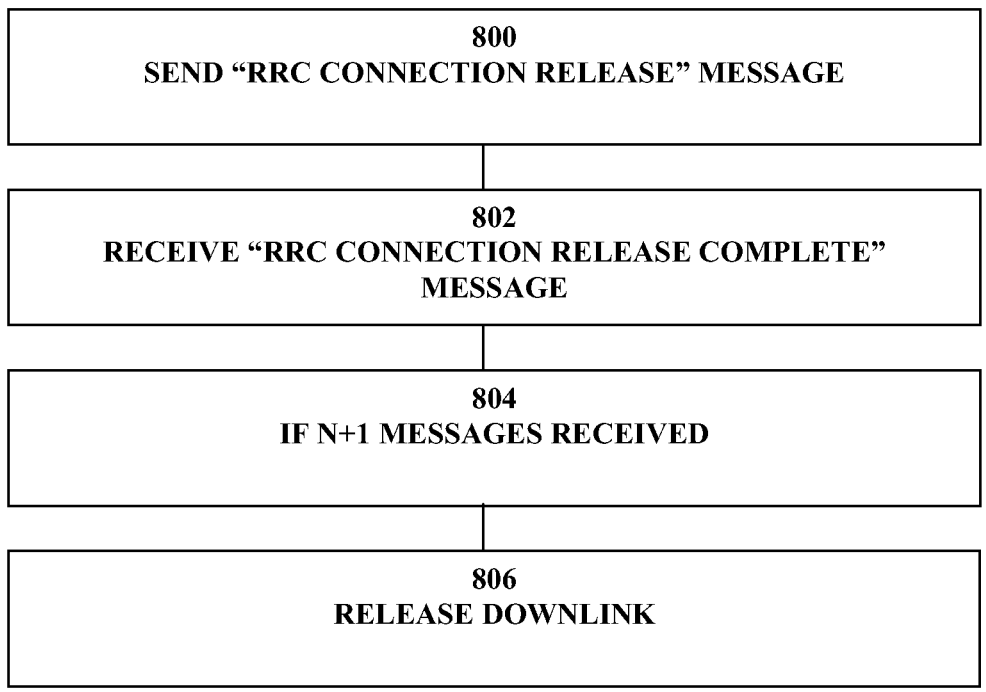
FIG. 8 is a flow diagram showing in more detail the steps performed at a UTRAN according to a second approach of the first aspect.

According to the second approach shown in FIG. 8, at step 800 the UTRAN sends the RELEASE message and at step 802 the UTRAN receives the COMPLETE message. At step 804, if (N308+1) such messages are received (or any other appropriate number corresponding to the number of COM- PLETE messages known to be sent by the UE) then at step 806 the UTRAN releases the downlink. This is because it is known that the UE has finished its release COMPLETE message sequence and hence will have released its uplink. It will be noted that in some instances not all COMPLETE messages will be received by the UTRAN simply because of the nature of the air interface. In that case, however, if a COMPLETE message is not received within an expected time or sequence period related for example to the known or estimated internal processing period at the UE for sending the COMPLETE message and the roundtrip time between the devices, it can be inferred that the COMPLETE message has in fact been sent. Hence even if not all COMPLETE messages are received, the sequence can be considered to be completed and the downlink released.

Figure 9:
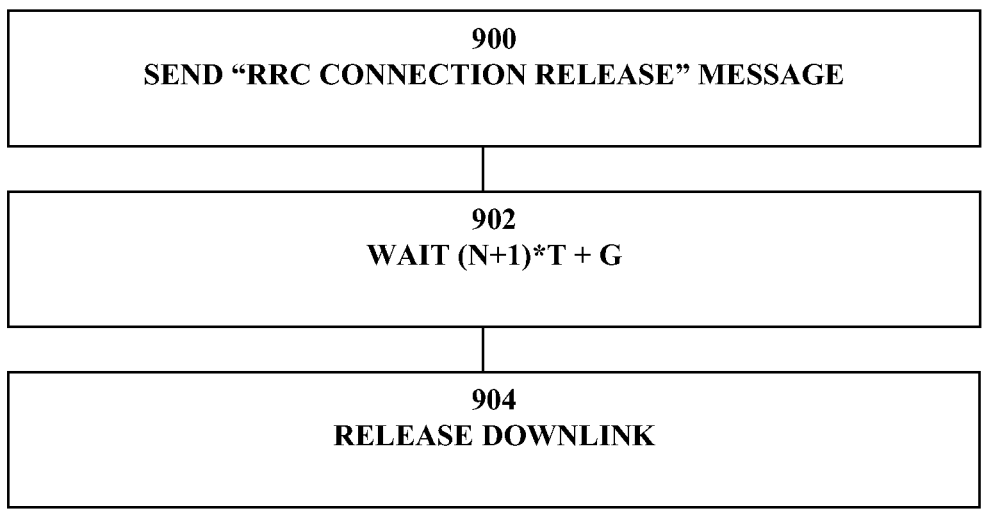
FIG. 9 is a flow diagram showing in more detail the steps performed by the UTRAN according to a third approach of the first aspect.

According to the third approach of the first aspect as shown in FIG. 9, at step 900 the UTRAN sends the RELEASE message in the manner described above and at step 902 the UTRAN waits until a time period has elapsed corresponding to a UE release period value after which the release complete sequence at the other component can be considered to have finished. For example this may be a period ((N308+1)*T308+G) where G is a guard period or any other appropriate measure of the time taken to send the complete messages at the UE. An optional roundtrip or guard period (G) can be built in to compensate for the time elapsed in processing at the UE or UTRAN which can be estimated from measurements of message exchanges or may be approximately known at the UTRAN. At step 904 the UTRAN releases the downlink once the period has elapsed. It will be seen, therefore, that the period is selected to be greater than or equal to the period within which it is known that the UE will have released its uplink, although the period can be selected such that if the periods do overlap any spike or interference that is encountered is within acceptable limits from the point of view, for example, of the network operator or user.

It will be noted that in some instances the UTRAN will send multiple RELEASE messages. In this case, to accommodate the possibility that the UE may not receive all RELEASE messages, the time period which the UTRAN waits before releasing the downlink can be triggered at the point at which the last RELEASE message is sent out.

According to the various approaches described with reference to the approaches in FIGS. 8 and 9, it will be seen that the downlink is released substantially simultaneously with or subsequent to the uplink such that the uplink power spike and interference are not encountered.

It will be further seen that according to the first to third approaches of the first aspect (FIGS. 7 to 9) operation at the UE is unchanged and can be, for example, as specified in the 25.331 specification.

Figure 10A:
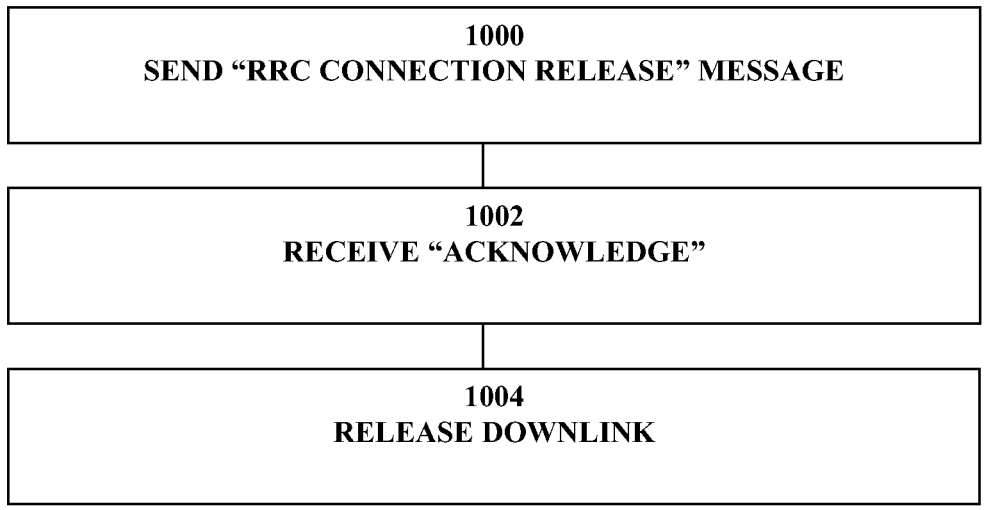
FIG. 10a is a flow diagram showing in more detail the steps performed at a UTRAN according to a fourth approach of the first aspect.

According to the fourth approach of the first aspect, as shown in FIG. 10*a*, at step 1000 the UTRAN sends the RELEASE message. However at step 1002 the UTRAN receives an acknowledge message from the UE and, at step 1004 when the acknowledge message is received from the UE, it releases the downlink It can be seen, therefore, that the downlink is only released once the uplink is known to have been released.

Figure 10B:
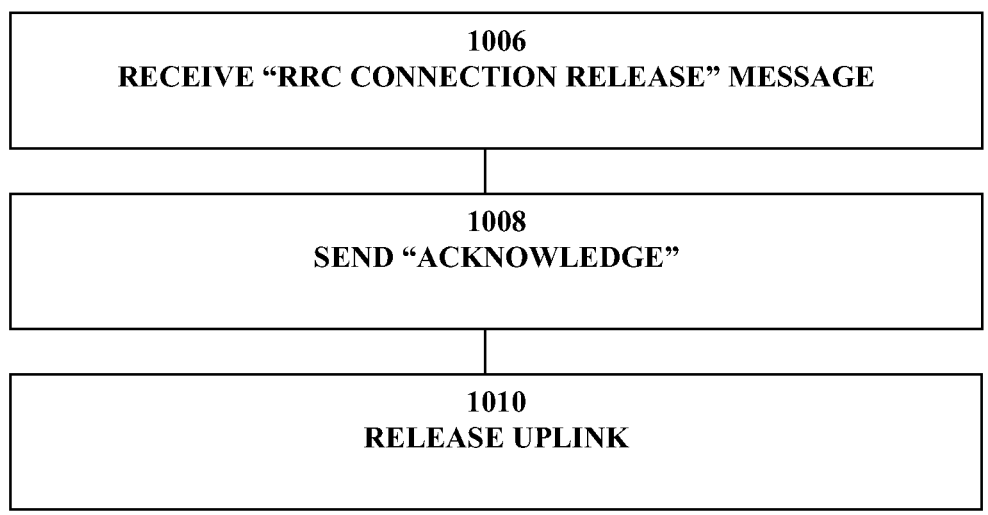
FIG. 10b is a flow diagram showing the steps performed at a UE according to the fourth approach of the first aspect.

In this case the user equipment is configured appropriately and, as shown in FIG. 10*b*, at step 1006 receives the RELEASE message, at step 1008 it sends an acknowledgement message to the UTRAN and, at step 1010, releases the uplink. Accordingly it can be seen that the UE implements AM as a result of which the UTRAN does not need to wait until it is known that the UE has finished its COMPLETE message sequence but instead can rely on an acknowledgement message. It will be seen that the UE could nonetheless continue to run its sequence of multiple COMPLETE messages but there would be little benefit in doing so if an acknowledgement mode were implemented. The specific manner in which AM can be implemented will be well known to the skilled reader and is not described in detail here—in particular the AM procedure is carried out by lower layers in the protocol stack.

Figure 11:
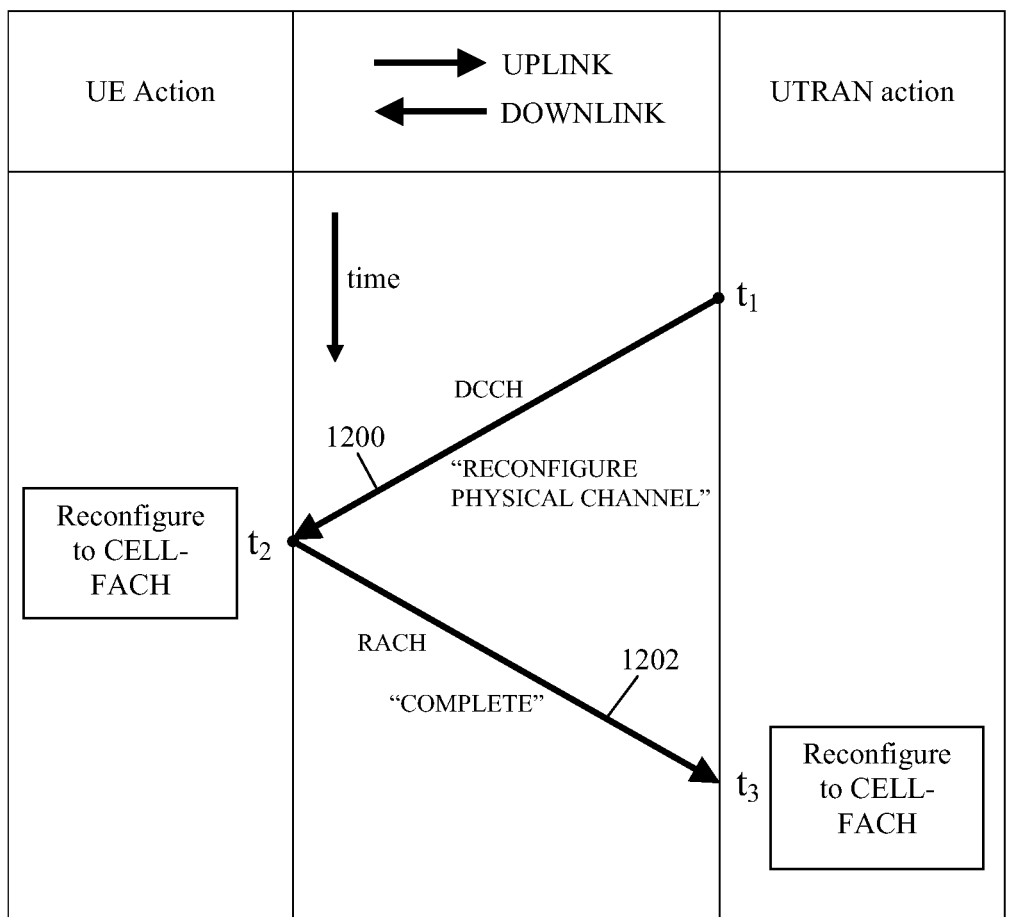
FIG. 11 is a diagram showing a release procedure between a UTRAN and a UE in CELL_FACH state according to a second aspect.

The second aspect of the method and apparatus is described with reference to FIG. 11 which shows the UTRAN and UE actions according to the second aspect. At a time $t_1$ the UTRAN sends a reconfigure message 1200 for example physical channel reconfiguration over, for example, the dedicated control channel DCCH, instructing the UE to reconfigure to a common link channel or channel state in which common channels are used such as CELL_FACH. At time $t_2$ the UE reconfigures to CELL_FACH and sends a COMPLETE message 1202 over a common channel such as a random access channel RACH. At time $t_3$ the UTRAN reconfigures to CELL_FACH as well, as a result of which the RRC Connection Release Procedure can take place in AM. In CELL_FACH state, channels have a link channel power in respective directions that is independent of the link channel in the opposite direction (for example because it relies on common channels). Hence, sending a reconfiguration instruction rather than proceeding through the release procedure in CELL_DCH ensures that the system moves quickly to a state where uplink spikes cannot occur. In particular, upon reconfiguration to CELL_FACH at the UE, at time $t_2$, the uplink dedicated channels are released. The UTRAN can then release its downlink dedicated channels upon reconfiguration to CELL_FACH at subsequent time $t_3$.

It will be noted that CELL_FACH has a release procedure as set out in the 25.331 specification but transmit power commands do not apply because of the use of common channels rather than dedicated channels.

It will be noted once again that the UE performs normal operation and in particular reconfigures channel according to the relevant part of the 25.331 standard.

Figure 12:
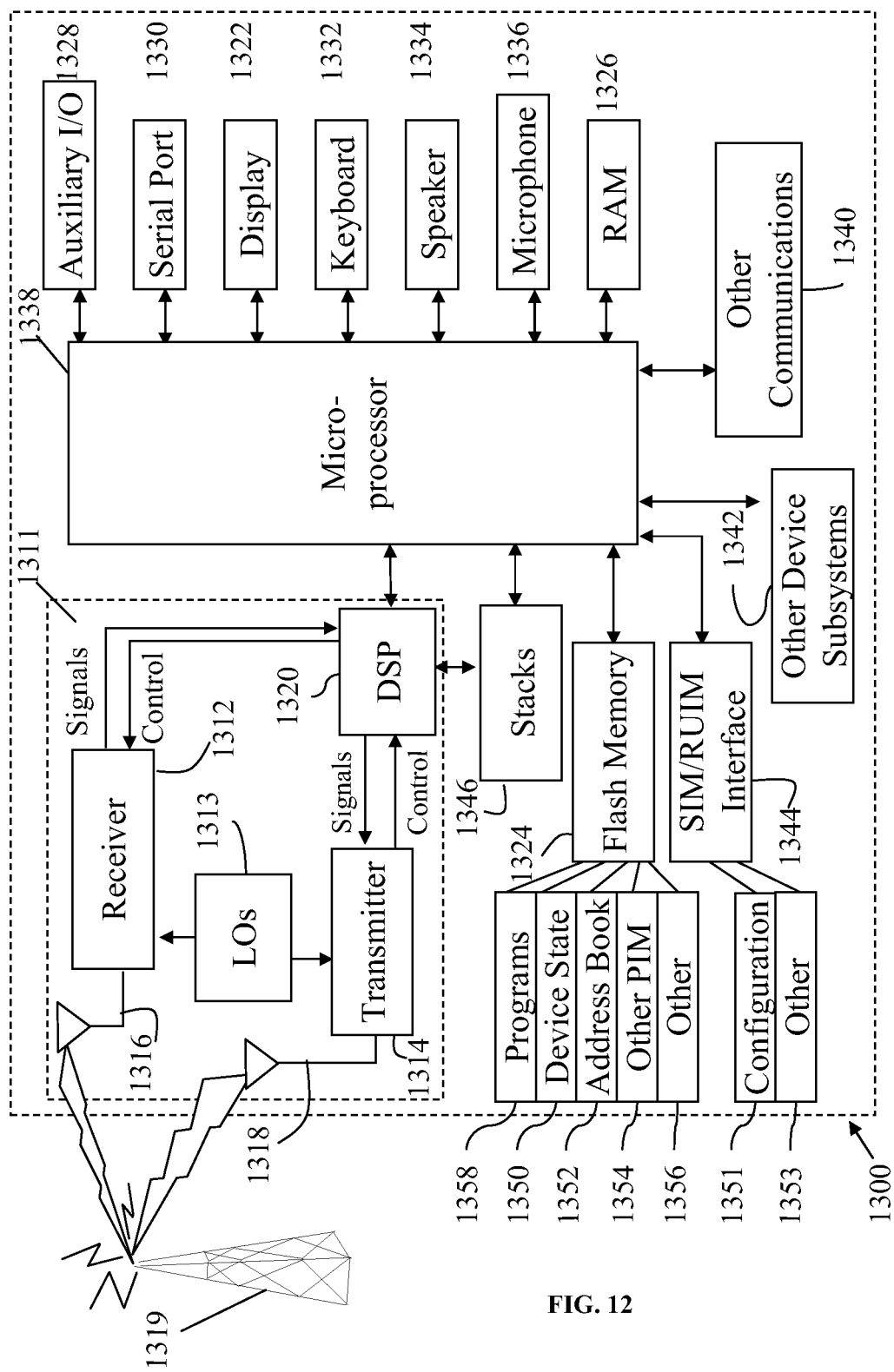
FIG. 12 is a block diagram illustrating a mobile device, which can act as a UE in accordance with the approach described herein.

Turning now to FIG. 12, FIG. 12 is a block diagram illustrating a mobile device, which can act as a UE and co-operate with the apparatus and methods of FIGS. 1 to 12, and which is an exemplary wireless communication device. Mobile station 1300 is preferably a two-way wireless communication device having at least voice and data communication capabilities. Mobile station 1300 preferably has the capability to communicate with other computer systems on the Internet. Depending on the exact functionality provided, the wireless device may be referred to as a data messaging device, a two-way pager, a wireless e-mail device, a cellular telephone with data messaging capabilities, a wireless Internet appliance, or a data communication device, as examples.

Where mobile station 1300 is enabled for two-way communication, it will incorporate a communication subsystem 1311, including both a receiver 1312 and a transmitter 1314, as well as associated components such as one or more, preferably embedded or internal, antenna elements 1316 and 1318, local oscillators (LOs) 1313, and a processing module such as a digital signal processor (DSP) 1320. As will be apparent to those skilled in the field of communications, the particular design of the communication subsystem 1311 will be dependent upon the communication network in which the device is intended to operate. For example, mobile station 1300 may include a communication subsystem 1311 designed to operate within the Mobitex™ mobile communication system, the DataTAC™ mobile communication system, GPRS network, UMTS network, or EDGE network.

Network access requirements will also vary depending upon the type of network 1302. For example, in the Mobitex and DataTAC networks, mobile station 1300 is registered on the network using a unique identification number associated with each mobile station. In UMTS and GPRS networks, however, network access is associated with a subscriber or user of mobile station 1300. A GPRS mobile station therefore requires a subscriber identity module (SIM) card in order to operate on a GPRS network. Without a valid SIM card, a GPRS mobile station will not be fully functional. Local or non-network communication functions, as well as legally required functions (if any) such as "911" emergency calling, may be available, but mobile station 1300 will be unable to carry out any other functions involving communications over the network 1302. The SIM interface 1344 is normally similar to a card-slot into which a SIM card can be inserted and ejected like a diskette or PCMCIA card. The SIM card can have approximately 64K of memory and hold many key configuration 1351, and other information 1353 such as identification, and subscriber related information.

When required network registration or activation procedures have been completed, mobile station 1300 may send and receive communication signals over the network 1302. Signals received by antenna 1316 through communication network 1302 are input to receiver 1312, which may perform such common receiver functions as signal amplification, frequency down conversion, filtering, channel selection and the like, and in the example system shown in FIG. 13, analog to digital (A/D) conversion. A/D conversion of a received signal allows more complex communication functions such as demodulation and decoding to be performed in the DSP 1320. In a similar manner, signals to be transmitted are processed, including modulation and encoding for example, by DSP 1320 and input to transmitter 1314 for digital to analog conversion, frequency up conversion, filtering, amplification and transmission over the communication network 1302 via antenna 1318. DSP 1320 not only processes communication signals, but also provides for receiver and transmitter control. For example, the gains applied to communication signals in receiver 1312 and transmitter 1314 may be adaptively controlled through automatic gain control algorithms implemented in DSP 1320.

Mobile station 1300 preferably includes a microprocessor 1338 which controls the overall operation of the device. Communication functions, including at least data and voice communications, are performed through communication subsystem 1311. Microprocessor 1338 also interacts with further device subsystems such as the display 1322, flash memory 1324, random access memory (RAM) 1326, auxiliary input/output (I/O) subsystems 1328, serial port 1330, keyboard 1332, speaker 1334, microphone 1336, a short-range communications subsystem 1340 and any other device subsystems generally designated as 1342.

Some of the subsystems shown in FIG. 12 perform communication-related functions, whereas other subsystems may provide "resident" or on-device functions. Notably, some subsystems, such as keyboard 1332 and display 1322, for example, may be used for both communication-related functions, such as entering a text message for transmission over a communication network, and device-resident functions such as a calculator or task list.

Operating system software used by the microprocessor 1338 is preferably stored in a persistent store such as flash memory 1324, which may instead be a read-only memory (ROM) or similar storage element (not shown). Those skilled in the art will appreciate that the operating system, specific device applications, or parts thereof, may be temporarily loaded into a volatile memory such as RAM 1326. Received communication signals may also be stored in RAM 1326.

As shown, flash memory 1324 can be segregated into different areas for both computer programs 1358 and program data storage 1350, 1352, 1354 and 1356. These different storage types indicate that each program can allocate a portion of flash memory 1324 for their own data storage requirements. Microprocessor 1338, in addition to its operating system functions, preferably enables execution of software applications on the mobile station. A predetermined set of applications that control basic operations, including at least data and voice communication applications for example, will normally be installed on mobile station 1300 during manufacturing. A preferred software application may be a personal information manager (PIM) application having the ability to organize and manage data items relating to the user of the mobile station such as, but not limited to, e-mail, calendar events, voice mails, appointments, and task items. Naturally, one or more memory stores would be available on the mobile station to facilitate storage of PIM data items. Such PIM application would preferably have the ability to send and receive data items, via the wireless network 1302. In a preferred embodiment, the PIM data items are seamlessly integrated, synchronized and updated, via the wireless network 1302, with the mobile station user's corresponding data items stored or associated with a host computer system. Further applications may also be loaded onto the mobile station 1300 through the network 1302, an auxiliary I/O subsystem 1328, serial port 1330, short-range communications subsystem 1340 or any other suitable subsystem 1342, and installed by a user in the RAM 1326 or preferably a non-volatile store (not shown) for execution by the microprocessor 1338. Such flexibility in application installation increases the functionality of the device and may provide enhanced on-device functions, communication-related functions, or both. For example, secure communication applications may enable electronic commerce functions and other such financial transactions to be performed using the mobile station 1300.

In a data communication mode, a received signal such as a text message or web page download will be processed by the communication subsystem 1311 and input to the microprocessor 1338, which preferably further processes the received signal for output to the display 1322, or alternatively to an auxiliary I/O device 1328. A user of mobile station 1300 may also compose data items such as email messages for example, using the keyboard 1332, which is preferably a complete alphanumeric keyboard or telephone-type keypad, in conjunction with the display 1322 and possibly an auxiliary I/O device 1328. Such composed items may then be transmitted over a communication network through the communication subsystem 1311.

For voice communications, overall operation of mobile station 1300 is similar, except that received signals would preferably be output to a speaker 1334 and signals for transmission would be generated by a microphone 1336. Alternative voice or audio I/O subsystems, such as a voice message recording subsystem, may also be implemented on mobile station 1300. Although voice or audio signal output is preferably accomplished primarily through the speaker 1334, display 1322 may also be used to provide an indication of the identity of a calling party, the duration of a voice call, or other voice call related information for example.

Serial port 1330 in FIG. 12, would normally be implemented in a personal digital assistant (PDA)-type mobile station for which synchronization with a user's desktop computer (not shown) may be desirable, but is an optional device component. Such a port 1330 would enable a user to set preferences through an external device or software application and would extend the capabilities of mobile station 1300 by providing for information or software downloads to mobile station 1300 other than through a wireless communication network. The alternate download path may for example be used to load an encryption key onto the device through a direct and thus reliable and trusted connection to thereby enable secure device communication.

Other communications subsystems 1340, such as a short-range communications subsystem, is a further optional component which may provide for communication between mobile station 1300 and different systems or devices, which need not necessarily be similar devices. For example, the subsystem 1340 may include an infrared device and associated circuits and components or a Bluetooth™ communication module to provide for communication with similarly enabled systems and devices.

When mobile device 1300 is used as a UE, protocol stacks 1346 include apparatus and a method for reducing link interference by a link between a user equipment component and an access network component.

The skilled reader will appreciate that any appropriate manner for implementing the additional steps described above at the UTRAN or UE can be adopted in hardware, software or firmware. For example the additional identification or acknowledgement steps can be implemented at the respective components in any appropriate manner.

Extensions and Alternatives

In the foregoing specification, the invention has been described with reference to specific embodiments thereof. It will, however, be evident that various modifications and changes may be made thereto without departing from the scope of the technique. The specification and drawings are, accordingly, to be regarded in an illustrative rather than a restrictive sense.

It is to be noted that the methods as described have shown steps being carried out in a particular order. However, it would be clear to a person skilled in the art that the order of the steps performed, where the context permits, can be varied and to that extent the ordering of the steps as described herein is not intended to be limiting.

It is also to be noted that where a method has been described it is also intended that protection is also sought for a device arranged to carry out the method and where features have been claimed independently of each other these may be used together with other claimed features.

It will further be understood that the method and apparatus described herein can be applied in relation to any release or similar procedure following steps as set out in any appropriate standard and between any appropriate user equipment components and access network components or indeed between components of a similar nature in any case where power between links in respect of directions is controlled by the link channel in the opposite direction where either can be an uplink or downlink.

Furthermore it will be noted that the apparatus described herein may comprise a single component such as a UE or UTRAN or other user equipment or access network components, a combination of multiple such components for example in communication with one another or a sub-network or full network of such components.

The invention claimed is:

1. A method of reducing link interference by a user equipment device (UE), the UE configurable for use in a cellular network using dedicated channels to a radio access network where the dedicated channels having a link in a first direction and a second direction, the method comprising:
   sending in the second direction a link connection release message for the link connection in the first direction;
   receiving one or more release complete messages in a release complete message sequence;
   monitoring a parameter representative of the link channel power in the first direction;
   identifying when the link connection in the first direction is released by comparison of the parameter with a threshold value; and
   when the link connection in the first direction is identified as released, releasing the link connection in the second direction.

2. The method as claimed in claim 1 in which the link connection in the first direction is identified as being released when the time period elapsed since the link connection release message was sent reaches a release period value for the link connection in the first direction.

3. The method as claimed in claim 2 in which, where multiple link connection release messages are sent, the time period elapsed is from the sending of the last link connection release message.

4. The method as claimed in claim 2 in which the release period value for the link connection in the first direction comprises the time for a release complete sequence at the other component.

5. The method as claimed in claim 4 in which the release complete sequence at the other component comprises sending one or more release complete messages.

6. The method as claimed in claim 4 in which the release period value further incorporates a message guard period.

7. A method of reducing link interference by a user equipment device (UE), the UE configurable for use in a cellular network using dedicated channels to a radio access network where the dedicated channels having a link in a first direction and a second direction, the method comprising:
   sending in the second direction a link connection release message for the link connection in the first direction;
   identifying when the link connection in the first direction is released when the time period elapsed since the link connection release message was sent reaches a release period value for the link connection in the first direction; and
   when the link connection in the first direction is identified as released, releasing the link connection in the second direction.

8. The method as claimed in claim 7 in which, where multiple link connection release messages are sent, the time period elapsed is from the sending of the last link connection release message.

9. The method as claimed in claim 7 in which the release period value for the link connection in the first direction comprises the time for a release complete sequence at the other component.

10. The method as claimed in claim 9 in which the release complete sequence at the other component comprises sending one or more release complete messages.

11. The method as claimed in claim 9 in which the release period value further incorporates a message guard period.

12. A computer readable medium having code means stored thereon, the code means, when executed by a processor in a user equipment device (UE) enables the processor to reduce link interference on dedicated channels comprising link channels, where a link channel in a first direction is controlled by a link channel in a second direction, the processor performing the operations of:

sending in the second direction a link connection release message for the link connection in the first direction;
receiving one or more release complete messages in a release complete message sequence;
monitoring a parameter representative of the link channel power in the first direction;
identifying when the link connection in the first direction is released by comparison of the parameter with a threshold value; and
when the link connection in the first direction is identified as released, releasing the link connection in the second direction.

\* \* \* \* \*

UNITED STATES PATENT AND TRADEMARK OFFICE
CERTIFICATE OF CORRECTION

PATENT NO. : 8,447,336 B2  
APPLICATION NO. : 12/706437  
DATED : May 21, 2013  
INVENTOR(S) : Andrew Farnsworth Page 1 of 1

It is certified that error appears in the above-identified patent and that said Letters Patent is hereby corrected as shown below:

In the Claims

Claim 1, Column 12, line 1, "where the dedicated channels having"

should read

--wherein the dedicated channels have--.

Signed and Sealed this  
Thirteenth Day of August, 2013

Teresa Stanek Rea  
*Acting Director of the United States Patent and Trademark Office*